United States Patent [19]

Shenk

[11] 3,821,547

[45] June 28, 1974

[54] EXPOSURE CONTROL SYSTEM INCORPORATING SOLID STATE SWITCHING TO ENABLE A LIGHT SENSITIVE NETWORK

[75] Inventor: Edwin K. Shenk, Littleton, Mass.

[73] Assignee: Polaroid Corporation, Cambridge, Mass.

[22] Filed: Feb. 21, 1973

[21] Appl. No.: 334,216

Related U.S. Application Data

[63] Continuation-in-part of Ser. No. 213,289, Dec. 29, 1971, abandoned.

[52] U.S. Cl. .......... 250/214 P, 95/10 CT

[51] Int. Cl. .......... H01j 39/12

[58] Field of Search .......... 250/214 R, 214 P, 229; 95/10 C, 10 CD, 10 CE, 10 CT

[56] References Cited

UNITED STATES PATENTS

| | | | |
|---|---|---|---|
| 3,442,190 | 5/1969 | Erickson | 250/214 P |
| 3,486,821 | 12/1969 | Westhaver | 250/214 P |
| 3,504,603 | 4/1970 | Brzonkala | 250/214 P |
| 3,591,829 | 7/1971 | Murata | 250/214 P |
| 3,620,143 | 11/1971 | Burgarella | 250/214 P |
| 3,649,128 | 3/1972 | Rothschild | 250/214 P |
| 3,651,744 | 3/1972 | Okada | 250/214 P |
| 3,659,509 | 5/1972 | Burgarella | 95/10 CT |
| 3,677,151 | 7/1972 | Werner | 95/10 CT |
| 3,678,826 | 7/1972 | Mori | 95/10 CT |
| 3,679,905 | 3/1971 | Watanabe | 250/214 P |

*Primary Examiner*—James W. Lawrence
*Assistant Examiner*—D. C. Nelms
*Attorney, Agent, or Firm*—Gerald L. Smith

[57] ABSTRACT

An exposure control system for photographic cameras of a variety which perform a number of operational events in the course of a photographic cycle. Among these events is a reflex conversion from a viewing-focusing operational mode to exposure operational mode and subsequent return to the said viewing-focusing mode. Gateable electronic switching means are utilized to retain the light detecting network of a light sensitive circuit in a pre-exposure initial condition prior to the commencement of the noted exposure mode. Preferably, the switching function is present in the form of a field effect transistor.

10 Claims, 4 Drawing Figures

EXPOSURE CONTROL SYSTEM INCORPORATING SOLID STATE SWITCHING TO ENABLE A LIGHT SENSITIVE NETWORK

RELATED APPLICATION

This is a continuation-in-part of application for United States Patent Ser. No. 213,289 filed Dec. 29, 1971, now abandoned by Edwin K. Shenk and entitled "Exposure Control System Incorporating Solid State Switching to Enable a Light Sensitive Network."

BACKGROUND

Automatic exposure control systems basically function to evaluate scene brightness, weight this evaluation with respect to the sensitometric characteristics of a film being exposed and regulate one or more variable exposure parameters such as exposure interval or aperture size in correspondence with that weighted evaluation. Scene brightness evaluation is performed with light measuring circuits utilizing one or more photosensitive elements positioned upon a camera and oriented in correspondence within the field of its taking lens. Generally, the light sensing elements operate in conjunction with integrating networks the outputs from which are introduced to triggering circuits or level comparators and which react upon such outputs reaching a predetermined threshold level value.

To perform within fully automatic photographic systems wherein both aperture and shutter speed are regulated in accordance with a given program, highly responsive light sensing circuits are preferred. To achieve necessary response, these circuits utilize such light sensors as silicon photodiodes or photovoltaic cells arranged to operate in a current mode. The latter sensing technique, in which a photovoltaic cell is operated in a current mode in conjunction with an operational amplifier having a feedback path including a timing capacitor, is described and claimed in detail in U.S. Pat. No. 3,620,143.

Typically, light sensing elements exhibit noise characteristics, for instance dark current and the like, which stem from random emissions and are related to a variety of causes including termperature, material, structure, etc. The influence of such noise upon an exposure regulating circuit becomes significant particularly where the circuits are operated at very low light levels. Further, where amplification stages are present within a control scheme, exterior noise signals can create inadvertently premature triggering of trigger circuits and the like, thereby aborting an exposure. Of particular importance, such signals may spuriously develop charge levels at the noted timing capacitors, thereby detracting from the quality of ensuing exposure regulation.

In some fully automated camera systems, light sensing circuit performance represents only one intermediate operational event of a series of such events defining a photographic cycle. Such complex cycles are available to camera designers in consequence of the convenience realized from incorporating a multitude of electronic components within integrated circuit structures. One such multifunction automatic camera is described in U.S. Pat. No. 3,714,879. The reflex camera described in the noted patent operates to convert from a viewing-focusing mode into an exposure mode prior to the activation of a light sensitive circuit. Following an exposure interval, the camera automatically cycles to perform cocking operations as well as motorized processing of an exposed film unit. In order to assure proper cycle operation, it is necessary to isolate and only selectively enable the exposure regulating circuits of the camera. This selective activation of the light sensing circuits heretofore has been provided through the use of mechanical switches which are factory calibrated to be actuated in synchronism with the initial opening movement of a shutter. Such switching features are not readily available in complex mechanisms associated with highly automatic cameras. Further, inherent delays occasioned from mechanical activation of a switch detract from the capability of automatic aperture mechanisms to establish very small apertures, for instance F/90.

Another reset feature which is highly desired in the automated camera system described above resides in a need to continuously remove any residual charge which may be present at the timing capacitors of light sensing networks. Ideally, a resetting arrangement providing such a feature should provide for the imposition of an impedance or discharging resistance across such capacitors whenever the camera or the circuit thereof is in a quiescent state, for instance, when the camera is shut down during periods of non-use. Of course, such a resistance should be established across the capacitor during all portions of a photographic cycle which are not directed to scene brightness evaluation.

SUMMARY

The present invention is addressed to control system for photographic apparatus in which a highly responsive light sensing circuit is electronically enabled by a solid state switch synchronously with the actuation of an exposure mechanism. Through the use of a particular form of solid state switching, precision in enabling the light sensitive circuit is available without recourse to the involved factory calibration otherwise required with mechanical switching procedures. Preferably, the solid state switching is present in the form of a depletion mode field effect transistor which is coupled in shunting relationship with a timing capacitor. The depletion mode transistor is selected exhibiting a predetermined channel resistance in the absence of a drain-to-source bias, i.e., in a quiescent state. Therefore, during periods of camera shutdown or periods of network de-energization during a photographic cycle, the resetting solid state switching feature of the invention ideally provides for the removal of residual charge at the timing capacitor.

The switching feature of the invention may also be present in the form of a field effect transistor, one state of which serves to isolate the integrating capacitor of a light sensing network during initial portions of a complex photographic cycle. By selectively gating the field effect transistor, the integrating network may be enabled for exposure control duty at a precise point in time within the cycle.

Another feature and object of the invention is to provide an exposure control system for photographic apparatus incorporating reset means in the form of a solid state switch incorporating a depletion mode field effect transistor which is coupled with the integrating network of the control circuit. The field effect transistor is configured having a reset state in the absence of a gate-to-source bias for effecting the removal of residual charge at the capacitor of the noted integrating network and the transistor is gateable to another state to enable the control circuit of the system.

Another object and feature of the invention is to provide a control system for photographic apparatus of a variety which is actuable to serially perform operational events in a predetermined order from first to last to define a photographic cycle. The control system includes a light sensitive circuit having at least one photosensitive element in electrical association with an integrating capacitor. An electrical path is provided across the capacitor in shunt relationship and this electrical path includes a solid state switching device which is normally conductive and is gateable into a substantially nonconductive state for purposes of removing the noted shunt. The noted gating may take place in conjunction with the time-out of select operational events within the noted photographic cycle.

Other objects of the invention will in part be obvious and will in part appear hereinafter.

The invention accordingly comprises the system and apparatus possessing the features, technique and properties which are exemplified in the description to follow hereinafter and the scope of the application will be indicated in the appended claims.

DETAILED DESCRIPTION

Figure 1:
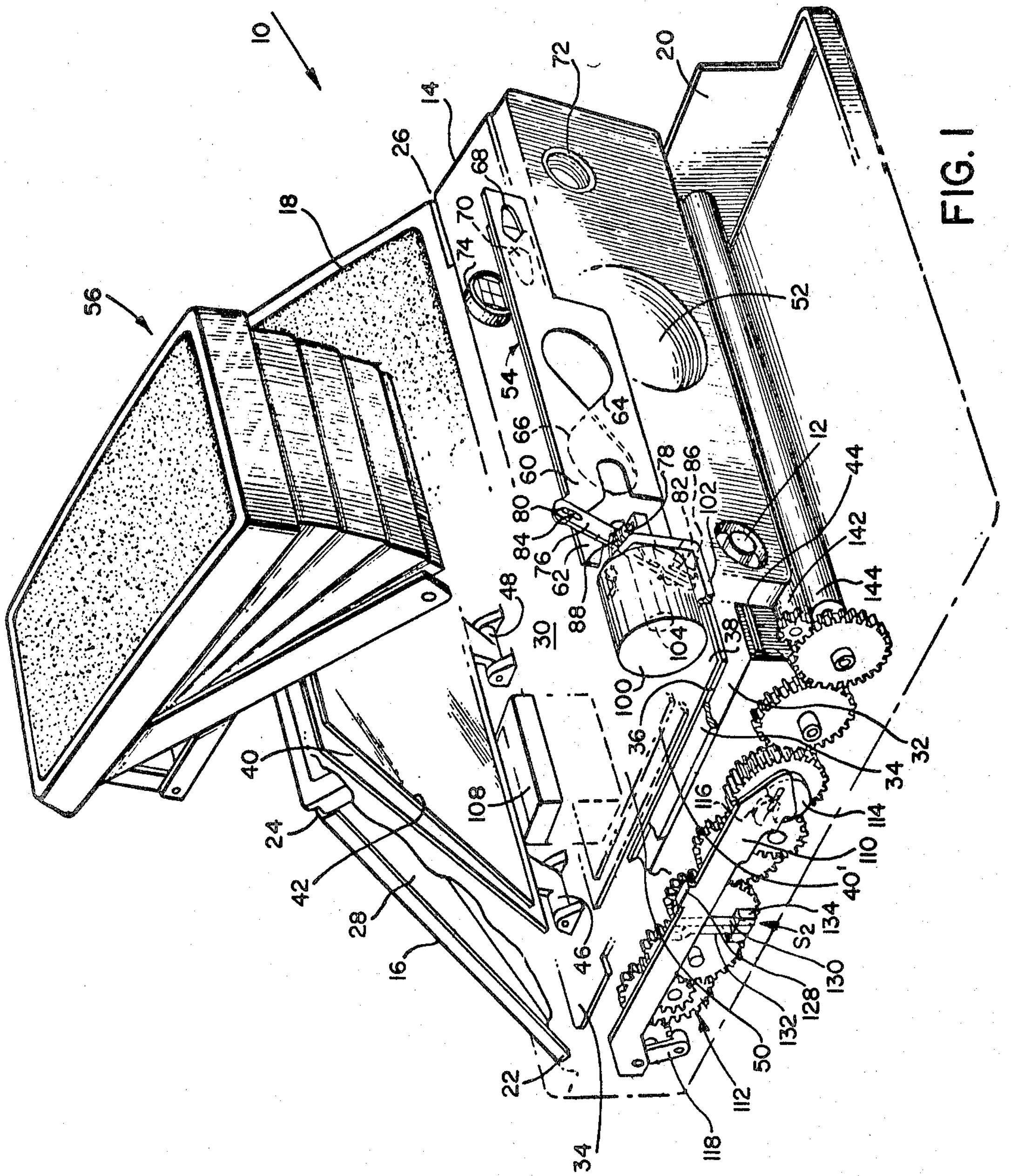
FIG. 1 is a pictorial view of a fully automatic handheld camera incorporating the control system features of the instant invention, the view having portions shown in phantom or broken away to reveal internal structure.

Referring to FIG. 1, a fully automatic camera suited for incorporating the control system of the instant invention is portrayed generally at 10. In the course of a single photographic cycle, the components of camera 10 are automatically rearranged from positions defining a viewing-focusing mode to orientations establishing an exposure mode, following which the initial viewing-focusing mode is re-established and an exposed film unit is automatically processed. The operational events establishing these mode conversions are sequentially carried out in response to the momentary depression of a singular start button 12 mounted within a forward face of an exposure housing 14. Exposure housing 14 is the forwardmost of a grouping of mutually pivoted or articulated housing components including a rear wall 16, forward wall 18 and a base member 20. These components are pivotally associated with base member 20 so to be foldable thereinto in nesting fashion. When so folded from the erected configuration shown, the camera 10 assumes a thin and compact shape suiting it to be conveniently carried in the pocket of a garment. The specific hinge connections providing for the articulated structure, while not being visible in the figure, are positioned at axes 22, 24, 26 and at the lower rear portion of exposure housing 14. When erected for making an exposure, rear wall 16, forward wall 18 and exposure housing 14 combine in conjunction with an opaque flexible bellows, a portion or fragment of which is illustrated at 28, to define an exposure chamber generally depicted at 30.

A film supply for camera 10 is provided by a disposable film retaining cassette 32 positioned within base member 20. Cassette 32 is removably positioned against an inner frame, a portion of which is shown at 34. Inner frame 34 is located within and defines the lower surface of exposure chamber 30. Formed having an upwardly facing rectangular film frame opening defined by a ridge 36, cassette 32 retains a stacked assemblage of film units. The uppermost one of these film units 38 is biased against the bottom of film frame ridge 36, a position coinciding with the exposure plane of camera 10.

Incorporating a highly refined viewing and focusing system, the camera 10 operates in a modified reflex fashion, being convertible between viewing-focusing and exposure operational modes by a reflex assembly including a somewhat planar reflex reflecting component 40. Shown in solid line fashion at the poisition assumed thereby for exposure mode operation, the component 40 is movable during a photographic cycle from a position shown in phantom at 40' representing its viewing-focusing orientation to the exposure mode position against rear wall 16. Movement between the operational mode positions illustrated is pivotal, component 40 being coupled to a rearward portion of inner frame 34 by hinge connections 46 and 48.

Fabricated of material opaque to light, reflex component 40 serves a dual function when in its viewing-focusing mode position at 40'. In particular, when at the noted 40' position, component 40 extends over and secures or seals the film frame opening defined by ridge 36 of cassette 32. The component additionally is structured to support a viewing surface 50 on its upwardly facing side.

When oriented for viewing and focusing purposes, the components of camera 10 establish an optical path extending from a taking lens assembly mounted with an exposure housing 14 at 52, through an open exposure mechanism shown generally at 54, thence to a mirror (not shown) positioned at the inner side of rear wall 16 an thence to viewing surface 50. Viewing surface 50 is configured having a texture and optical design facilitating focusing of the image of a scene to be photographed. This image may be viewed by the camera operator through a collapsible optical entrance assembly depicted generally at 56. A configuration suited for viewing surface 50 is described in U.S. Pat. No. 3,690,240 by Nathan Gold entitled "Reflecting Imaging Apparatus," while the assembly 56 and its related internal components are described in detail and claimed in a copending application for U.S. Patent by James G. Baker, filed Dec. 15, 1970 entitled "Reflex Camera and Viewing Device," Ser. No. 98,356, and assigned in common herewith.

During a viewing-focusing operational mode, exposure mechanism 54 establishes an aperture opening of maximum available size. Described in U.S. Pat. No. 3,641,889 entitled "Exposure Control System," by V. K. Eloranta, mechanism 54 is formed having two blades 60 and 62 which slidably ride in a track (not shown) across the optical path of the camera. Each blade 60 and 62, is formed having a teardrop-shaped aperture opening shown, respectively, as 64 and 66. Additionally, the blades are formed having secondary or control openings shown, respectively, at 68 and 70 which move cooperatively before the light detecting elements of a light sensitive circuit. In the latter regard, an entrance optical assembly 72 serves to direct light from the scene being photographed through an opening established by openings 68 and 70 and into a photocell structure as shown generally at 74.

Openings 64 and 66 of respective blades 60 and 62 are mounted for movement across the optical path of camera 10 as it is established at taking lens 52. Depending upon the position of blades 60 and 62, openings 64 and 66 symmetrically overlap to define selectively varying aperture sizes. Secondary or control openings 68 and 70 are configured in correspondence with the contours of respective openings 64 and 66. These control openings also move with mutual symmetry over the optical path established by entrance optics 74 to insert information into the control circuit of the camera representing the immediate aperture value defined by overlapping openings 64 and 66. Note in FIG. 1 that blades 60 and 62 are so positioned to entirely block passage of light along the optical path of camera 10 as well as into the photocell structure 74.

Blades 60 and 62 move in the noted mutual symmetry as a result of their connection with a walking beam shown at 76. Walking beam 76 is formed having a centrally disposed hub portion 78 which is journalled for rotation about an upstanding stud (not shown) extending from the rearward portion of exposure housing 14. Elongated slots at 80 and 82 are formed in the upward tip portions of beam 76 for the purpose of providing connection with pins 84 and 86 extending, respectively, from blades 60 and 62.

Thus interconnected, the blades 60 and 62 move simultaneously and in correspondence with each other to define a continuous progression of symmetrically configured variable aperture openings over the camera optical path at taking lens 52 as well as over the light sensing optical path, the entrance of which is shown at 72.

Walking beam 76 is biased for rotation by a spring 88, the central portion of which is wound about the hub 78. The movable end of spring 88 is configured so as to bias walking beam 76 in a direction urging blades 60 and 62 toward a terminal position establishing an aperture of maximum available width.

Movement of blades 60 and 62 from their normally open orientation permitting viewing and focusing into a closed orientation as shown in FIG. 1 is carried out by a tractive electromagnetic drive present as a solenoid 100 mounted within exposure housing 14 upon a bracket as at 102. Solenoid 100 is designed having an internally exposed cylindrical plunger or armature 104 which retracts inwardly within an excitation winding upon energization thereof. Plunger 104 is connected to walking beam 76 by a comb-shaped connector 106 which slidably fits over a pin (not shown) extending from beam 76.

When solenoid 100 is energized to retract plunger 104, walking beam 76 is rotated rapidly against the bias of spring 88 to move blades 60 and 62 into the fully closed orientation shown in FIG. 1. When mechanism 54 exhibits this fully closed condition, exposure chamber 30 is secured and camera 10 may be automatically converted between its operational modes.

During a viewing-focusing operational mode, spring 88 holds blades 60 and 62 at the noted terminal position defining maximum aperture, while reflex component 40 is held in its light securing position 40′ by an actuator system. This system operates through the interaction of drive springs (not shown) normally biasing component 40 away from position 40′ and a motor driven latching arrangement. Described in detail in the above-noted U.S. Pat. No. 3,714,879, the actuator system utilizes the output of a motor 108 which serves to regulate a mechanical control linkage. This control linkage includes a ram 110 extending along the length of camera 10 and an elongated thin gear train, certain components of which are shown generally at 112. Gear train 112 is driven from motor 108 and includes one reduction ratio circuit terminating in a phase control cam 114 which is rotatably driven through one revolution in the course of a single photographic cycle. Cam 114 operates in conjunction with a cam follower 116 mounted upon the inwardly facing side of ram 110. Ram 110, in turn, is slidably positioned along the outer face of gear train 112 and is drivably connected to an input bell crank 118. Bell crank 118 is coupled into hinge assembly 46 through the noted drive springs which continually bias reflex component 40 to pivot about hinges 46 and 48 into the solid line position illustrated in FIG. 1 abutting the inner face of rear wall 16. The drive spring, as well as other associated linkages required to provide this upward bias, are described in detail in the above-noted U.S. Pat. No. 3,714,879.

Figure 2:
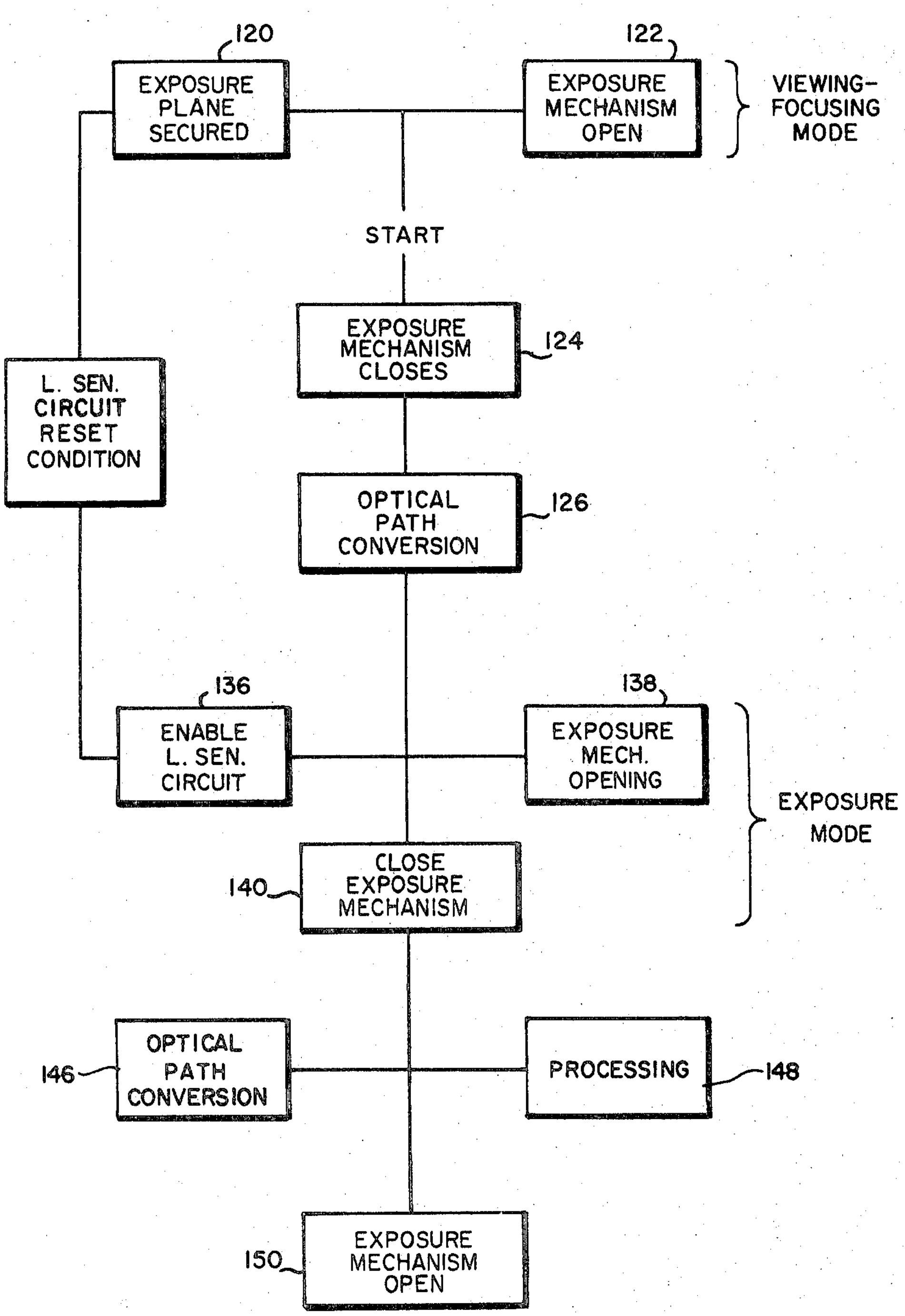
FIG. 2 is a block logic diagram showing the sequence of events occurring during a photographic cycle of the camera of FIG. 1.

Referring additionally to FIG. 2, the sequence of programmed operational events occurring in the course of a single photographic cycle is illustrated in block form. For instance, during a viewing-focusing mode, the exposure plane of camera 10 is secured as a result of the positioning of reflex component 40 at its position 40′. This orientation is represented by block 120. Additionally during the viewing-focusing mode, exposure mechanism 54 is retained in a terminal position under the bias of spring 88 to establish an open aperture of maximum width as indicated by block 122. Reflex component 40 is latched at position 40′ as a result of its mechanical interconnection from bell crank 118 through ram 110. Ram 110 is retained in its rearwardmost position by virtue of the contact of follower 116 with a high dwell portion of phase cycle cam 114. Upon depressing start button 12, a photographic cycle is initiated as indicated in FIG. 2, and the first operational event taking place is that of energizing solenoid 100 to close exposure mechanism 54 as indicated at block 124. Solenoid 100 is retained in this energized state while motor 108 momentarily is energized to rotate phase cycle cam 114 just sufficiently to permit follower 116 to pass over a rapid fall-off portion of cam 114. The earlier described latching association of the ram 110 with reflex component 40 thereby is terminated and component 40 is driven to its exposure mode position against rear wall 16 as ram 110 correspondingly is driven forwardly along the side of camera 10. This forward position is shown in FIG. 1. Movement of reflex component 40 to its exposure position provides an optical path conversion as indicated by function block 126. The period required for this conversion is electronically timed and following an appropriate time-out, an exposure mode start signal is derived to commence exposure mode operation of camera 10. The derivation of the noted signal partially is a result of a switching activity associated with the movement of ram 110. For instance, as ram 110 moves forwardly, an inwardly extending tab 128 releases from engagement with a resilient leaf 130 of a switch identified generally as $S_2$. Switch $S_2$ additionally includes a resilient leaf 132 which is supported along with leaf 130 from an insulative base 134 fixed to base member 20. Accordingly, the contacts 130 and 132 of switch $S_2$ are opened in synchronism with the movement of component 40 from its position 40'.

Upon receipt of an exposure mode start signal, the excitation winding of solenoid 100 is de-energized and, simultaneously, the light sensing circuit of camera 10 including photocell structure 74 is enabled. De-energization of solenoid 100 releases walking beam 76 for rotation under the bias of spring 88. As walking beam 76 rotates, a progressively enlarging aperture opening is defined by the openings 64 and 66 of respective blades 60 and 62. Simultaneously with the commencement of exposure along the optical path of the camera, openings 68 and 70 move in synchronism to define a progressively enlarging aperture before photocell structure 74.

As is apparent, the exposure of uppermost film unit 38 is carried out along a reoriented optical path extending from taking lens 52 through exposure mechanism 54, thence to a mirror 42 positioned on the downward facing side of component 40, thence to the exposure plane and uppermost film unit 38. The exposure control circuit of the camera responds to the modulated light input to photocell structure 74 to control the extent of opening of the aperture defined by openings 64 and 66 and, at an appropriate point in the course of exposure interval, solenoid 100 is again re-energized to terminate an exposure by blocking the optical path.

Looking to FIG. 2, it may be noted that the exposure mode operation of camera 10 includes the operational events of enabling the light sensitive circuit thereof as indicated at block 136, while simultaneously commencing the opening of exposure mechanism 54 as shown at block 138. As noted at function block 140, the exposure mode is terminated with energization of solenoid 100 to close the exposure mechanism.

The second energization of solenoid 100 continues until the optical path is reconverted to its viewing-focusing mode orientation and while an uppermost exposed film unit 38 is drawn for processing between a pair of rolls 142 and 144. Roll 142 is driven through pinion 146 from a second reduction circuit within gear train 112. As gear train 112 is driven, cam 114 is rotated so as to reassert contact with follower 116 to drive ram 110 rearwardly, thereby moving reflex component 40 into its viewing mode position 40'.

At the cemmencement of the noted optical path reconversion, a pick mechanism (not shown) urges uppermost film unit 38 from its position within cassette 32 through an egress slot 44 and into the bite or point of contact between rolls 142 and 144. Described in detail in U.S. Pat. No. 3,672,890 by E. H. Land, entitled "Novel Photographic Products and Processes," film units as at 38 are structured to contain a processing fluid which is spread therewithin to cause the formation of a visible positive image. The above-described post exposure operational events including optical path conversion to a viewing-focusing mode and processing of film unit 38 are depicted respectively at blocks 146 and 148.

As a photographic cycle is terminated, switches as at $S_2$ are reactuated or closed by the movement of ram 110 and the entire control system is shut down to de-energize solenoid 100, thereby permitting blades 60 and 62 to move under the bias of spring 88 to re-establish an optical path entrance opening of maximum available aperture. This realignment of blades 60 and 62 to their normally fully open positions is indicated in FIG. 2 at block 150.

In view of the complexity of operations performed by the control system of camera 10 at the commencement of a photographic cycle as described in connection with blocks 120 through 126, it is essential that the light sensitive exposure regulating circuit thereof be immune from spurious noise and the like generated by dark current, motor actuation, solenoid energization, switching operations and the mechanical manipulation of various components within the photographic assembly. Accordingly, the integrating capacitor of any such light sensing circuit must be maintained in a reset condition and enabled to perform only in synchronism with commencement of an exposure interval. The synchronization technique for enabling the light sensing circuit particularly is critical where the exposure mechanism operates under a program in which apertures as small as F/90 are established. The use of conventional mechanical switches for this purpose may lead to unacceptable calibration costs.

Figure 3:
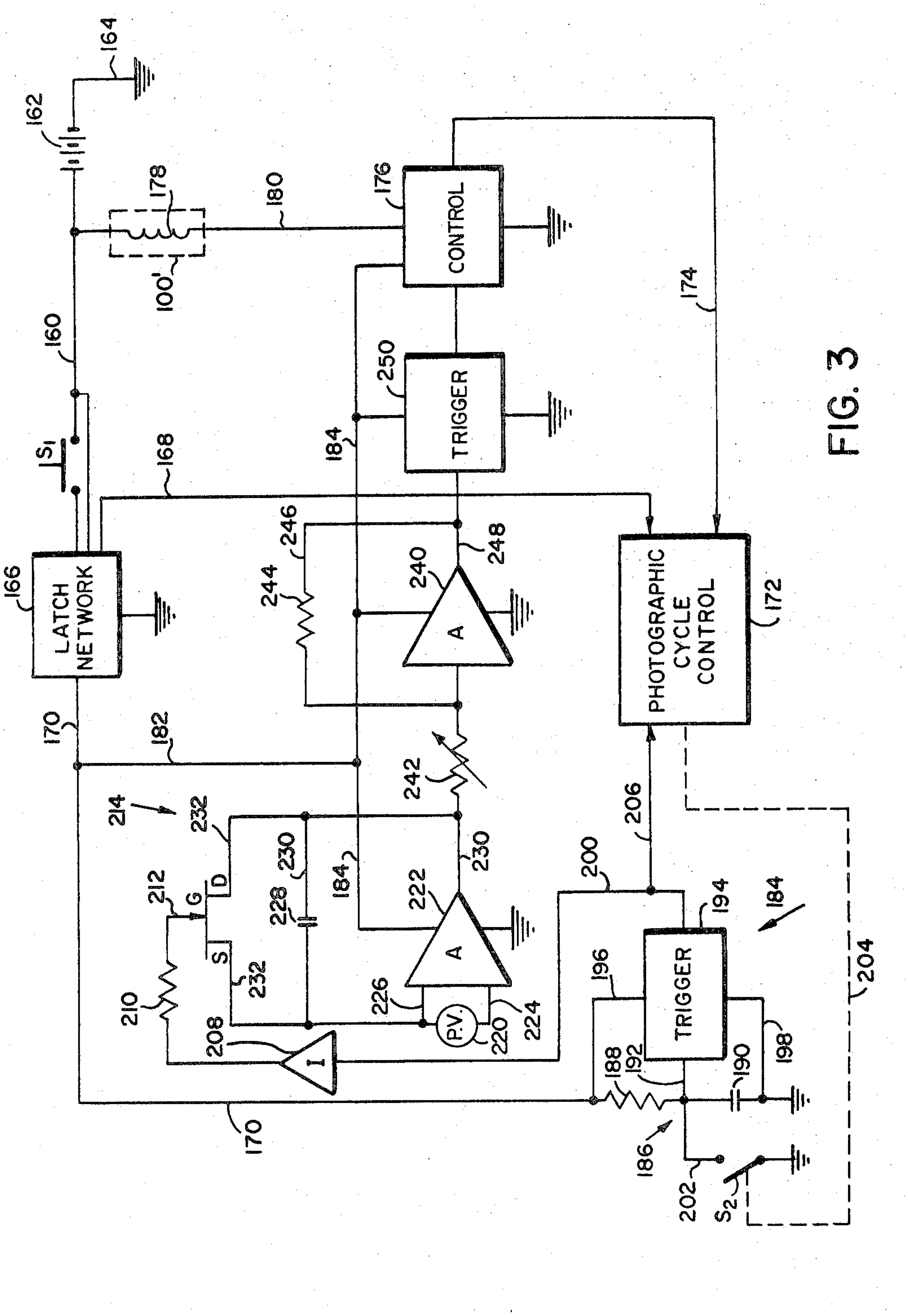
FIG. 3 is a schematic diagram of a control circuit as used in conjunction with the exposure control system of the camera of FIG. 1.

Turning to FIG. 3, a control circuit for operating camera 10 in accordance with the above-described program is shown which, additionally, incorporates a solid state switching arrangement assuring an ideal synchronization of the enabling of a light sensing circuit with the commencement of an exposure interval. As noted in connection with FIG. 1, a photographic cycle is commenced with the depression of start button 12. Such actuation serves to close a switch designates $S_1$ in FIG. 3. Switch $S_1$ is normally biased towards an open circuit condition. Closure of switch $S_1$ activates a primary power line 160. Line 160 is connected with the positive side of a battery 162, the opposite side thereof being connected through line 164 to ground. When activated by switch $S_1$, line 160 serves to energize a latching network indicated generally at block 166. Network 166 serves to selectively energize the control circuit throughout an entire photographic cycle, notwithstanding the release of the contacts of switch $S_1$. The network 166 is described in detail and claimed in copending application for U.S. Pat. entitled "Control System for Photographic Apparatus" by J. P. Burgarella, P. P. Carcia and R. C. Kee, Ser. No. 213,317 filed concurrently herewith and assigned in common herewith. Energization of latch 166, in turn, energizes branch power lines as at 168 and 170. Line 168 serves to energize the photographic cycle control function of camera 10, as indicated generally by block 172. This control function 172 provides for the ordered sequence of operational events as are particularly described in connection with FIG. 2. Such a control arrangement is described in detail and claimed in a copending application for U.S. patent by E. K. Shenk entitled "Reflex Camera With Motor Drive," Ser. No. 134,725 filed Apr. 16, 1971 and assigned in common herewith. Control function 172 is operationally coupled as by line 174 to a control circuit 176 which operates to selectively energize and de-energize the excitation winding 178 of solenoid 100. This select energization and de-energization is carried out along a line 180 which is connected between control circuit 176 and primary power line 160. Solenoid 100 is represented in FIG. 3 by a dashed boundary 100'.

Power for performing regulatory functions within control circuit 176 is supplied from branch power line 170 through lines 182 and 184. As discussed in connection with FIG. 2, through appropriate command from control block 172, control circuit 176 serves to initially energize solenoid 100 at the commencement of an exposure cycle and to retain such energization state until camera 10 has converted from a viewing-focusing mode to an exposure mode and an electrical command is given to commence exposure. Control 172 also provides appropriate energization of motor 108 (FIG. 1) to mechanically implement the noted mode conversion.

The discrete components of a delay network forming a sub-system of photographic cycle control 172 are illustrated generally at 184. Delay network 184 includes an R-C timing network 186 including timing resistor 188 and timing capacitor 190 connected between branch power line 170 and ground. A line 192 couples the interconnection between resistor 188 and capacitor 190 with the input of a trigger circuit depicted by block 194. Trigger 194 may be present as a Schmitt trigger or as a differential comparator of conventional design, operating as a non-inverting amplifier. Energized from branch power line 170 through line 196 and coupled to ground through line 198, the output at 200 of comparator 194 remains substantially at ground reference potential or "low" until a signal is received at its input 192 which is at least equal to a predetermined reference level voltage. Upon receipt of such signal, the output at line 200 assumes or approaches the voltage status of power line 170, i.e., a "high" status. The time constant of network 186 is selected in correspondence with the amount of time required for reflex component 40 to reach its elevated, exposure mode position following the actuation of switch $S_2$. Switch $S_2$ is present in delay network 184 within a shunt line 202 connected between line 192 and ground, i.e., across capacitor 190. The means for mechanically actuating switch $S_2$ are depicted in FIG. 3 as a dashed line 204, however, such actuation has been discussed in connection with tab 128 extending from ram 110.

Following the noted time-out of network 186, a threshold signal is developed at input line 192 of trigger 194, thereby causing its actuation altering the output at line 200 to a "high" status. The "high" output at line 200 represents the electronic signal utilized for signaling the completion of mode conversion and the commencement of an exposure interval. This "high" signal is introduced to photographic cycle control 172 along line 206 and through an inverter 208 and resistor 210 to the electronic switching arrangement 212 of a light sensitive circuit depicted generally at 214. Note that the enabling signal from the trigger 194 is introduced simultaneously to the photographic cycle control as well as the light sensing circuit 214 at the commencement of an exposure interval. This simultaneous introduction provides for very accurate but relatively simply achieved synchronization between these important control components.

Light sensitive circuit 214 includes a photovoltaic cell 220 positioned within camera 10 and supported at 74 behind entrance optics 72. Photocell 220 is connected with the input of an operational, differential type amplifier 222 by lines 224 and 226. A timing capacitor 228 is present within line 230, in turn, serving within the feedback path extending from the output line 230 of amplifer 222 and its input at line 226.

Described in greater detail in U.S. Pat. No. 3,620,143, the output of this light sensing arrangement represents an integrated valuation of scene lighting as witnessed at the optical path of camera 10 and which is modified in correspondence with the aperture defined by blades 60 and 62.

To assure that light sensing circuit 241 remains undisturbed by circuit transients induced by noise or dark currents generated within photovoltaic cell 220 during the initial portion of a photographic cycle, capacitor 228 is shunted or held in a reset condition until such time as the enabling exposure mode signal is received from delay network 184. This selective shunt is asserted about capacitor 228 from line 232, which line is coupled from each side of capacitor 228 to junctions with line 230. The conductive status of line 232 is regulated by electronic switch 212 which preferably is present as a field effect transistor (FET). Such transistors are available in several forms, for instance junction as well as metal-oxide types are known. The transistor shown at 212 is an n-channel junction field effect transistor having drain and source terminals S and D coupled in switching fashion within line 232. The drain-source channel of FET 212 is rendered conductive to exert the noted shunt about capacitor 228 when the gate-to-source voltage $V_{GS}$ is of appropriately positive polarity. This gating condition is imposed from line 200 and the output of trigger 194 throughout the noted initial portions of a photographic cycle. When an exposure mode commencement signal is introduced through line 200, its inverted "low" form is equal to pinch-off voltage to reduce conduction across the drain-source terminals of FET 212 to zero. The noted pinch-off voltage generally is considered one of a value wherein gate-to-source voltage is of a level and polarity to drive channel depletion layers to zero spacing and, as a consequence, cause channel resistance to approach infinity.

Upon removal of the shunt across capacitor 228 simultaneously with the release of exposure mechanism blades 60 and 62, the noted light responsive signal is generated at output 230 and is varied in accordance with the sensitometric properties of the film being exposed by a second amplification stage 240. Amplification stage 240 operates in conjunction with gain adjusting variable resistor 242 and a calibrating resistor 244, the latter being positioned in a feedback path 246. The noted film speed and calibration adjustment of the output at line 230 is described in greater detail and claimed in U.S. Pat. No. 3,641,891 by J. P. Burgarella, entitled "Exposure Control System."

The adjusted output from light sensitive circuit 214 is presented along line 248 to a trigger circuit 250. Similar to trigger 194, trigger 250 may be of a differential comparator type of Schmitt variety having an output stage which converts from one conductive state to another upon the receipt of a predetermined threshold value signal at the input thereof. When the signal value at 248 reaches the threshold level of trigger 250, the output thereof at line 250 converts from one conductive state to another to command control circuit 176 to again energize excitation winding 178 of solenoid 100. This energization causes blades 60 and 62 of exposure mechanism 54 to be driven to a closed position. An exposure is terminated thereby.

Following closure of blades 60 and 62 to terminate an exposure interval, photographic cycle control function 172 operates to re-energize motor 108 and thereby commence a reconversion of the components of camera 10 to a viewing-focusing mode as well as to carry out a processing of an exposure film unit. In the course of this operation, tab 128 on ram 110 recloses the contacts of switch $S_2$ thereby resetting timing capacitor 190. The initial viewing-focusing mode is re-established with the de-energization of the control system of the camera. This de-energization of solenoid excitation winding 178, thereby permitting blades 60 and 62 of exposure mechanism 54 to establish an open shutter condition evidencing widest available aperture. Further, the re-establishment of a shunt condition about capacitor 190 assures that the output at line 200 of trigger 194 will assume a "low" status at the commencement of the next succeeding photographic cycle. Such "low" status, when inverted at 208 provides the necessary "high" status for gating FET 212 into a conductive state at the commencement of the next succeeding photographic cycle.

Figure 4:
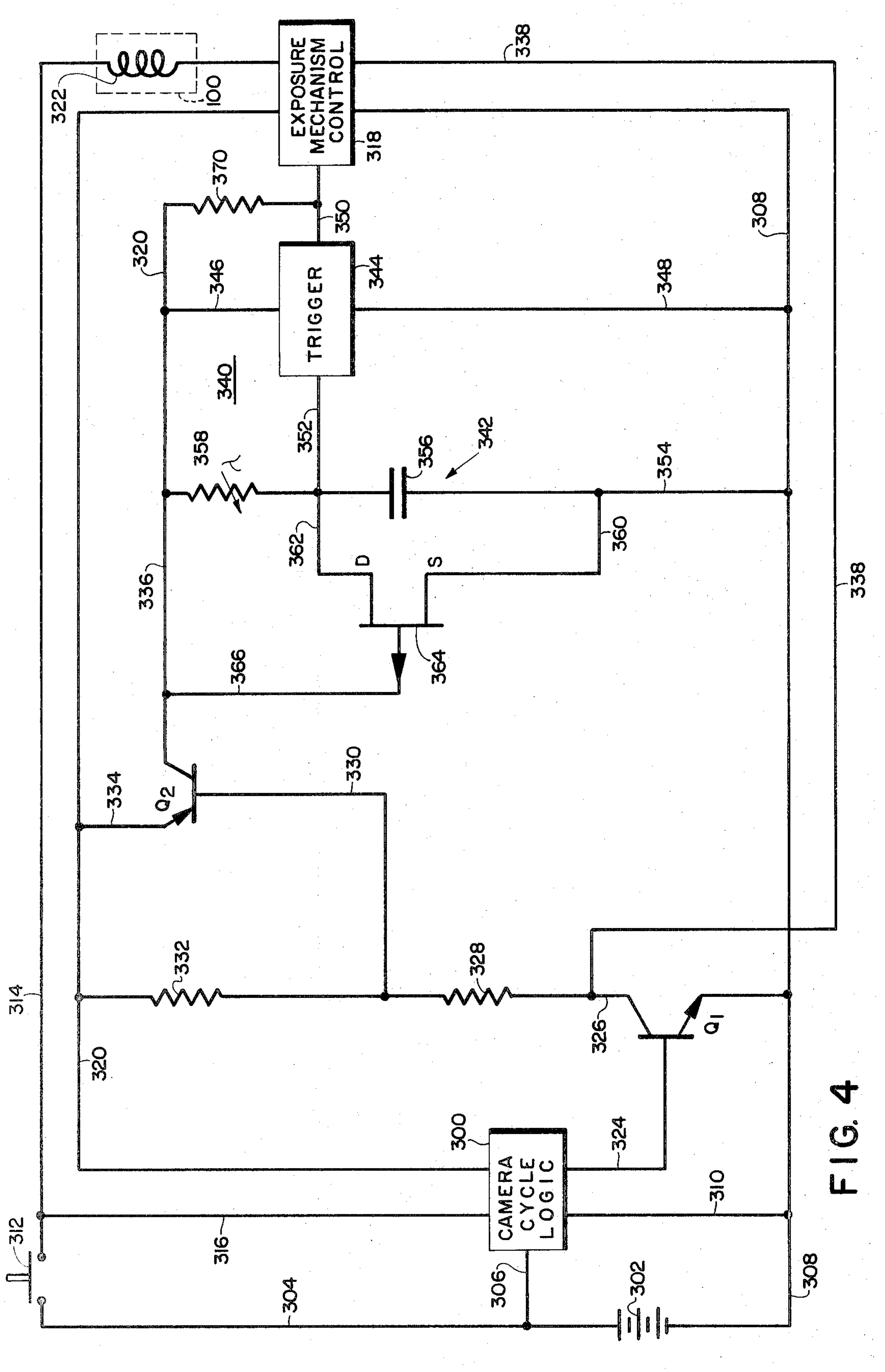
FIG. 4 is a schematic diagram of another control circuit which may be utilized in conjunction with the camera displayed at FIG. 1.

Referring to FIG. 4, a preferred resetting arrangement is described in conjunction with an alternate photographic control circuit. This circuit is described in detail in a copending application for U.S. patent, Ser. No. 134,725 entitled "Reflex Camera with Motor Drive" by E. K. Shenk, filed Apr. 16, 1971 and assigned in common herewith. Looking to the drawing, the logic circuit and related instrumentalities which cause a fully automated camera to carry out the series of operational events described in conjunction with FIG. 1 is represented functionally by block 300. Logic function 300 is powered from a battery power supply 302. In this regard, the positive terminal of battery 302 is connected with logic function 300 through lines 304 and 306, while the negative terminal of battery 302 is connected through a ground reference line 308 and line 310 to function block 300. As in the earlier embodiment, a photographic cycle is commenced with the momentary depression of a start switch as shown at 312. When closed, switch 312 serves to couple line 304 with a main power line 314. Such closure serves initially to activate a typical latching function within cycle logic function 300 through the completion of a circuit including line 316.

When thus activated, camera cycle logic function 300 serves to activate an exposure mechanism control function 318 through energization of a logic power line 320. Exposure mechanism control 318 is connected with both ground reference line 308 and logic power line 320. Thus activated, exposure mechanism control 318 carries out the initial energization of excitation winding 322 of solenoid 100 (FIG. 1). Solenoid 100 is represented in the instant figure by a dashed boundary 100'. As depicted in FIG. 2 in conjunction with function block 124, energization of solenoid 100 causes the blades of exposure mechanism 54 to block the optical path of camera 10. When such path blockage is carried out, camera cycle logic function 300 causes the carrying out of an optical path conversion as described in conjunction with function block 126 of FIG. 2. When such optical path conversion is completed, camera cycle logic function 300 introduces a biasing current from line 324 to forward bias an NPN transistor $Q_1$. The base of transistor $Q_1$ is connected to line 324, while its emitter is connected to ground reference line 308 and its collector is connected through line 326, bias resistor 328 and line 330 to the base of a PNP transistor $Q_2$. A resistor 332 is connected in line 326 between line 330 and logic power line 320 to provide "turn-off" bias at transistor $Q_2$. The emitter of transistor $Q_2$ is connected the logic power line 320 through line 334 and its collector is connected with exposure function power line 336.

Transistor $Q_1$ and $Q_2$ being thus interconnected, when transistor $Q_1$ is forward biased from line 324, conduction to ground reference line 308 will be completed and the base-emitter junction of transistor $Q_2$ also will be forward biased.

Conduction across transistor $Q_1$ also activates a current diverting or signalling line 338 extending from line 326 at the collector side of transistor $Q_1$ to exposure mechanism control function 318. The resultant signal at line 338 serves to cause exposure mechanism control function 318 to de-energize winding 322 of solenoid 100. As a consequence, the blades of exposure mechanism 54 commence to open.

As described in conjunction with function blocks 136 and 138 of FIG. 2, activation of exposure function power line 336 serves to enable a light sensitive control circuit 340. Circuit 340 comprises an R-C network 342 which operates in conjunction with a Schmitt-type trigger 344. Trigger 344 is connected with exposure function power line 336 through line 346 and to ground reference line 308 through line 348. The trigger 344 is of conventional design, operating as a non-inverting amplifier. The output of trigger 344 at line 350 remains substantially at ground reference potential or "low" until a signal is received at its input 352 which is at least equal to a predetermined reference level voltage. Upon receipt of such signal, the output at line 350 assumes or approaches the voltage status of exposure function power line 336.

Input line 352 of trigger 344 is coupled with line 354 of light sensitive network 342 at a point intermediate a timing capacitor 356 and light dependent resistor or photocell 358. Line 354, in turn, is connected between exposure function power line 336 and ground reference line 308. Accordingly, network 342 is activated simultaneously with the activation of exposure function power line 336.

Capacitor 356 is held in a reset condition prior to the activation of network 342 by a shunt imposed thereacross by a subcircuit including lines 360 and 362. Lines 360 and 362, respectively, are connected with the source and drain terminals of a P channel depletion mode field effect transistor (FET) 364. The gate terminal of field effect transistor 364 is coupled through line 366 to exposure function power line 336. Accordingly, at the activation of line 336, a gate-to-source bias is asserted at FET 364 of sufficient level and polarity to drive the channel depletion layers thereof to zero spacing, and, as a consequence, cause channel resistance to approach infinity. In effect, the subcircuit including lines 360 and 362 is open circuited to remove the shunt across capacitor 356. Inasmuch as this open circuit gating signal is derived ultimately from the activation of exposure function power line 336, the shunt across capacitor 356 is removed simultaneously with the activation of trigger 344 and de-energization of excitation winding 322.

During the ensuing exposure interval, the output at line 350 of trigger 344 remains "low" until a threshold voltage level is reached at input line 352. During the exposure interval, current is permitted to pass from line 336 through a bias resistor 370 to communicate with ground level through the output stage of trigger 344. When network 342 achieves the requisite level to cause trigger 344 to rapidly alter the output at line 350 from a "low" to a "high" state, current passes from line 336 through bias resistor 370 to effect appropriate gating within exposure mechanism control 318. This gating causes control 318 to re-energize excitation winding 322 of solenoid 100. Accordingly, the blades of exposure mechanism 54 are closed as described in connection with function block 140 of FIG. 2. Simultaneously with the re-energization of winding 322 from exposure mechanism control function 318, camera cycle logic function 300 removes the forward bias heretofore asserted from line 324 at transistor $Q_1$. As a consequence, transistor $Q_2$ is turned off to de-activate exposure function power line 336 to, in turn, remove the bias asserted at FET 364. In the resultant quiescent state, FET 364 exhibits a predetermined channel resistance within the shunt subcircuit including lines 360 and 362. As a consequence, the charge at capacitor 356 is rapidly removed. Of particular importance, the channel resistance now presented across capacitor 356 remains to dissipate any spurious charge buildup at the capacitor. In effect, a continuous resetting function is provided even though the camera is shut down.

Following the closure of the blades of exposure mechanism 54, camera cycle logic function 300 causes the camera to complete the photographic cycle as described in connection with function blocks 146, 148 and 150 of FIG. 2.

It readily can be seen that many variations and modifications of the present invention are possible in light of the aforementioned teachings, and it will be apparent to those skilled in the art that changes in the form and arrangement of components may be made to suit requirements without departing from the spirit and scope of the invention. It is, therefore, to be understood that within the scope of the appended claims, the instant invention may be practiced in a manner otherwise than is specifically described herein.

I claim:

1. An exposure control system for photographic apparatus comprising:

circuit means including at least one light sensing element connected within an integrating network including a capacitor, said network being operative to generate an output signal, when enabled from an initial pre-exposure condition wherein said capacitor is in an uncharged state;

exposure mechanism means actuable to commence an exposure of photosensitive material and responsive to said output signal for regulating the value of said exposure;

reset means coupled with said integrating network for selectively establishing said network initial condition and including a depletion mode field effect transistor coupled in shunting relationship with said capacitor, said transistor having a normally quiescent state asserting a predetermined resistance across said capacitor to derive said initial condition by shunting said capacitor and gatable to a second state to enable said circuit means by removing said shunt about said capacitor; and regulator means operative to actuate said exposure mechanism means to commence a said exposure and synchronously gate said transistor to said second state.

2. The exposure control system of claim 1 in which said field effect transistor includes gate, source and drain terminals, said source and drain terminals being coupled across said capacitor in said shunting relationship, the channel resistance between said terminals providing said predetermined resistance when said transistor is in said quiescent state.

3. The exposure control system of claim 2 in which said reset means is operative to prevent imposition of a gate-to-source bias upon said field effect transistor to derive said normally quiescent state.

4. The exposure control system of claim 3 in which said field effect transistor is formed having a said channel resistance value selected for rapidly removing residual charge of said capacitor in the absence of a gate-to-source bias.

5. The exposure control system of claim 2 in which said reset means is operative to apply to said field effect transistor a gating voltage in the pinch-off region thereof to establish said second state removing the shunt imposed through said predetermined resistance.

6. A control system for photographic apparatus actuable to serially perform operational events in a predetermined order from first to last defining a photographic cycle, comprising:

instrumentality means actuable to perform said operational events including an exposure mechanism selectively actuable to define an exposure of photosensitive material;

light sensitive circuit means including at least one photosensitive element in electrical association with an integrating capacitor for deriving, when enabled, an output signal corresponding with the light level of a scene to be photographed;

exposure control circuit means responsive to said output signal for actuating said exposure mechanism;

reset means having means defining an electrical path connected in shunt relationship with said capacitor and including a field effect transistor gatable from a quiescent state establishing a predetermined channel resistance for dissipating charge upon said capacitor to a substantially non-conductive state for selectively removing said shunt across said capacitor; and cycle control means for selectively actuating said instrumentality means to carry out a said photographic cycle and operative to gate said field effect transistor into said non-conductive state in synchronism with the actuation of said exposure mechanism.

7. The control system of claim 6 in which cycle control means is operative to maintain said field effect transistor in said quiescent state to effect assertion of said shunting relationship throughout said operational events carried out from the commencement of a said photographic cycle until said gating into said nonconductive state in synchronism with the actuation of said exposure mechanism.

8. The control system of claim 7 in which said field effect transistor is present as a depletion mode field effect transistor having gate, source and drain terminals, said drain and source terminals being connected for inserting said channel resistance within said path.

9. The control system of claim 8 in which said cycle control means is operative to generate an electrical cycle signal for effecting a said actuation of said exposure mechanism to commence a said exposure and for simultaneously effecting the gating of said field effect transistor to establish said non-conductive state.

10. The control system of claim 8 in which said cycle control means is operative to continuously maintain said field effect transistor in said quiescent state until a gate-to-source bias is exerted thereupon to effect said gating and is further operative to generate a cycle phase signal for effecting a said actuation of said exposure mechanism to commence a said exposure and for simultaneously effecting the gating of said field effect transistor to establish said non-conductive state.

* * * * *